United States Patent
Cezario et al.

(10) Patent No.: US 11,979,078 B2
(45) Date of Patent: May 7, 2024

(54) ROTOR FOR ROTARY ELECTRIC MACHINE, PROCESS FOR MANUFACTURING AND CORRESPONDING ROTARY ELECTRIC MACHINES

(71) Applicant: WEG EQUIPAMENTOS ELETRICOS S.A., Jaragua do Sul (BR)

(72) Inventors: Cassiano Antunes Cezario, Jaragua do Sul (BR); Dionei Scottini, Jaragua do Sul (BR); Emerson Hamerschmitt, Jaragua do Sul (BR); Ramon Gomes Da Silva, Jaragua do Sul (BR); Rubens Fernando Missio, Jaragua do Sul (BR)

(73) Assignee: WEG EQUIPAMENTOS ELETRICOS S.A., Jaragua do Sul (BR)

( * ) Notice: Subject to any disclaimer, the term of this patent is extended or adjusted under 35 U.S.C. 154(b) by 0 days.

(21) Appl. No.: 17/337,271

(22) Filed: Jun. 2, 2021

(65) Prior Publication Data
US 2021/0384797 A1 Dec. 9, 2021

Related U.S. Application Data

(60) Provisional application No. 63/034,282, filed on Jun. 3, 2020.

(51) Int. Cl.
*H02K 1/28* (2006.01)
*H02K 1/276* (2022.01)
*H02K 5/18* (2006.01)
*H02K 7/04* (2006.01)
*H02K 15/03* (2006.01)
*H02K 15/16* (2006.01)

(52) U.S. Cl.
CPC ............... *H02K 7/04* (2013.01); *H02K 1/276* (2013.01); *H02K 5/18* (2013.01); *H02K 15/03* (2013.01); *H02K 15/165* (2013.01); *H02K 2205/09* (2013.01)

(58) Field of Classification Search
CPC ...... H02K 17/00; H02K 17/16; H02K 17/165; H02K 15/00; H02K 15/02; H02K 15/0012
See application file for complete search history.

(56) References Cited

U.S. PATENT DOCUMENTS 4,556,809 A * 12/1985 Beisse .................... H02K 21/46
310/211
2004/0231818 A1* 11/2004 Edwards ............ B22D 19/0054
164/109

(Continued)

FOREIGN PATENT DOCUMENTS

| CN | 106487129 | 3/2017 |
| CN | 208423973 | 1/2019 |
| DE | 102018117886 A1 * | 2/2019 |

(Continued)

*Primary Examiner* — Tran N Nguyen
(74) *Attorney, Agent, or Firm* — Knobbe, Martens, Olson & Bear LLP (57) ABSTRACT

A rotor is provided with injected fixing bars having functional pins formed in a single piece and including a bar and two functional pins. The functional pins include one or more fixing regions for tying of one or more rotor packages of plates of the rotor. A process is for manufacturing the rotor A rotary electric machine can include the rotor.

20 Claims, 10 Drawing Sheets

(56) References Cited

U.S. PATENT DOCUMENTS

2016/0099629 A1* 4/2016 Akashi .................... H02K 1/30
                                                      310/51
2018/0269761 A1* 9/2018 Ulbrich ................ H02K 17/165

FOREIGN PATENT DOCUMENTS

| EP | 3316452 A1 * | 5/2018 |
| KR | 101084354 | 11/2011 |
| WO | WO2005122362 A1 * | 12/2005 |

* cited by examiner

ROTOR FOR ROTARY ELECTRIC MACHINE, PROCESS FOR MANUFACTURING AND CORRESPONDING ROTARY ELECTRIC MACHINES

FIELD OF APPLICATION

The present invention relates to the field of rotary electric machines, in particular to the methods for manufacturing and assembling synchronous electric machines provided with reluctance or permanent magnet rotors, notably the field of centralization of the rotor inside the stator, as well as fixing, balancing and cooling and/or venting of the package of plates.

BACKGROUND OF THE INVENTION

Rotary electric machines are equipment used for the transformation of electrical into mechanical energy, in the case of motors, and vice versa, in the case of generators. Basically, they are comprised of four basic structures, namely the case, stator, rotor and bearings/caps.

The case is the element responsible for integration of the additional structures, housing the stator and the rotor.

The stator is the active (energized) static component responsible for conducting the magnetic flow so as to rotate the rotor, in the case of motors, and conduct the energy generated by the rotor, in the case of generators, while the rotor is the active (energized) rotary component of the rotary electric machine.

The bearings and caps are the elements responsible for coupling the static parts to the rotary parts of an electric rotary machine.

In addition to these elements, and depending on the different features of each rotary electric machine, there may be auxiliary systems such as those for excitation, cooling, lubrication, among others.

The rotor, on the other hand, is basically composed of a shaft having arranged thereon a package of plates or sheets, on which poles that can be salient or non-salient are mounted, in the case of synchronous motors, with the possibility of fixing cooling and/or venting elements, such as fans, fins and the like to one or both ends.

The plates in the package of plates are usually fixed together by means of weld beads and/or fastening elements such as screws, pins, clamps and the like. This is necessary to form a package of plates suitably structured to withstand the use conditions of a motor, such as centrifugal force, temperature and other factors that can influence and compromise the dimensional stability of the rotor set.

The poles which are permanent magnets in the motors of the nature treated herein, can be mounted in through openings or longitudinal slots and parallel to the rotor shaft, these openings may be formed in the rotor package of plates or in elements provided with openings or slots externally coupled to the plates.

Centralization of the rotor inside the stator of the rotary electric machine is given by the bearings and/or caps and its balancing can be done either by removing or adding mass to specific locations.

STATE OF THE ART

In the state of the art there are several solutions for manufacturing and assembling rotors, as well as fixing the plates, thus forming the rotor package of plates, each of said solutions aiming to combine robustness with reduced manufacturing time and costs.

An example is the patent document CN208423973 that reveals and describes a typical motor construction of the nature treated herein, which uses pressing plates and screws for rotor fixing, which is a clear disadvantage because not only does it add unnecessary mass to the rotor, it also interferes with the electrical and magnetic characteristics of the motor, compromising, in particular, its performance. In addition, it involves a complex structure that requires several assembly steps, with balancing still being a time-consuming task.

Another solution in the state of the art is described by patent document CN106487129, which describes an electric motor having a rotor comprising short-circuit rings with the function of damping winding by the formed aluminum cage. Again, the disadvantages of patent document CN208423973 described above are repeated.

The patent document KR101084354 reveals and details an electric motor rotor in which aluminum bars are inserted into grooves (not injected) and short-circuited by a welded aluminum sheet, forming a device similar to a squirrel cage, which functions as a dampener. In this case, once again the disadvantages of the documents previously discussed are repeated, in which structures with a number of components are coupled to packages of welded plates and cages, balancing is still a time-consuming step and thus adds to manufacturing costs, as well as influencing the time and complexity for assembling the structure. In addition, the motor from KR101084354 also comprises a cooling fan and conventional venting, which is yet another component amongst a large number of parts and which requires axial space in the rotor build.

Lastly, it is important to mention that the state of the art also fails to describe elements for fixing magnets into their slots which are simple, feature a process for manufacturing that will not thermically impact the rotor, having a composition (material) which does not hinder the rotor electromagnetic performance, and having a build/assembly that will not add burdensome steps to the rotor manufacture/assembly As can be inferred from the above description, there is space and demand for an electric motor rotor solution having a simple project and assembly, capable of overcoming the disadvantages of the state of the art.

Objectives of the Invention

Thus, one of the objectives of the present invention is to provide a rotor with injected fixing bars having functional pins according to features of claim 1 in the appended set of claims.

Another objective of the present invention is to provide a corresponding process for manufacturing according to the features of claim 12 in the appended set of claims.

Yet another objective of the present invention is to provide a corresponding rotary electric machine according to the features of claim 15 in the appended the set of claims.

Additional features and features detailing are presented in the dependent claims.

BRIEF DESCRIPTION OF THE DRAWINGS

For better understanding and visualization of the object of the present invention, it will now be described with reference to the appended drawings, representing the technical effect obtained by means of an exemplary embodiment which is non-limiting to the scope of the present invention, in that, schematically.

DETAILED DESCRIPTION OF THE INVENTION

The present invention relates to a rotor (100) comprising a shaft (200), one or more packages of plates (300), injected fixing bars (400) having functional pins (420) and permanent magnets or just magnets (500).

The shaft (200) of the rotor (100) according to the invention is a shaft (200) known from the state of the art and of the type commonly used for applications in rotary electric machines.

The package of plates (300) of the rotor (100) according to the invention is formed by a plurality of plates (310), as shown in FIGS. 2, 3, 3b, 4 and 6, made of material suitable for electric motors of the nature treated herein and known in the state of the art, each plate (310) having, essentially and non-limiting, a central hole (320), perimeter through-holes (330) and through-holes for magnets or slots (340), there being possibly one or more equal or different packages of plates (300), being equal or different amongst themselves, arranged in the same shaft (200)

Figure 4:
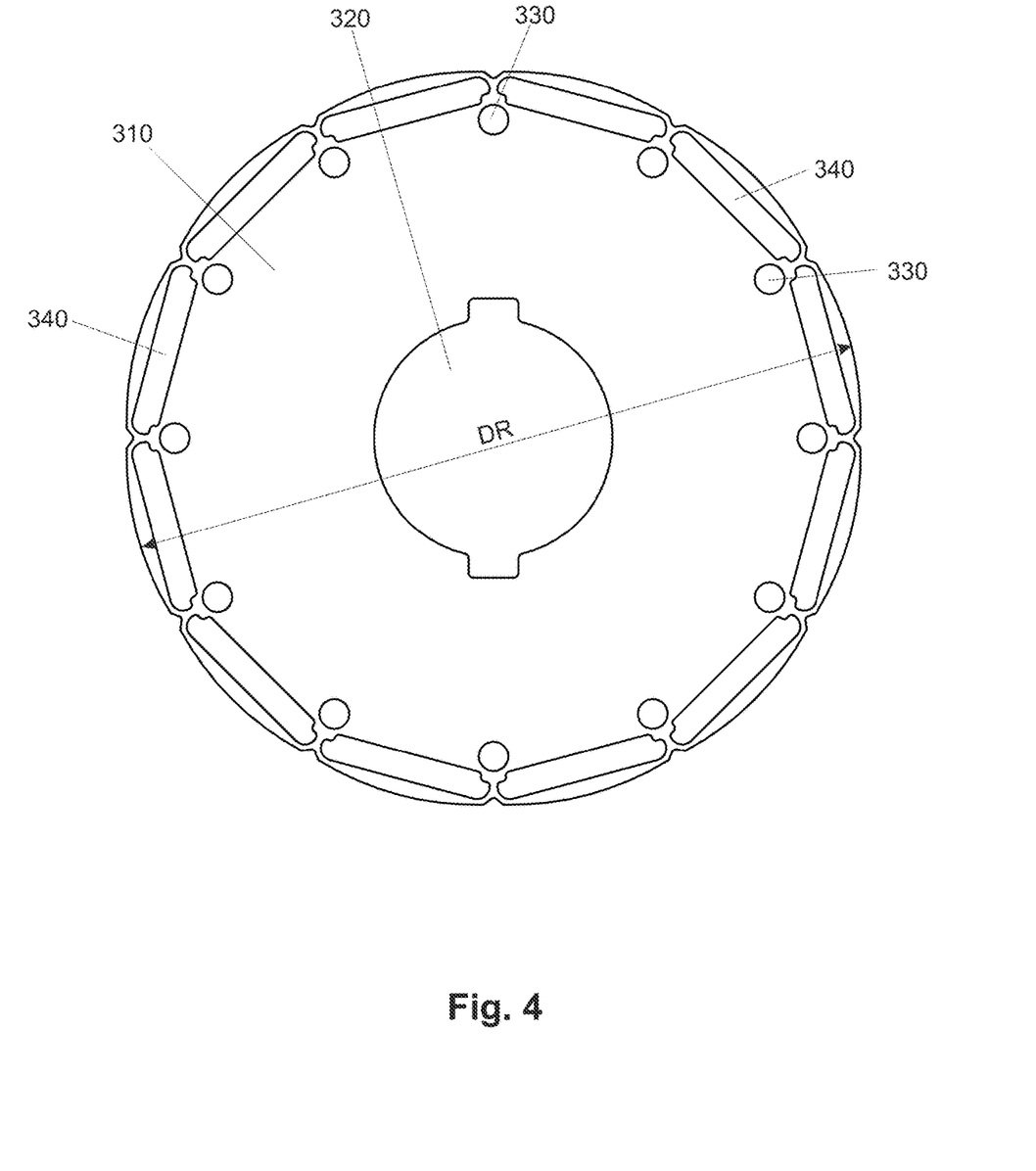
FIG. 4: shows a front view of a rotor plate according to the invention.

The central hole (320) allows for insertion of the shaft (200) and may include, if necessary, additional openings for passage over cotters and other elements.

The perimeter holes (330) are arranged in positions having a low density of magnetic flux.

The plates (310) are manufactured by means and processes known from the state of the art and common for rotary electrical machines of the nature treated herein, which can be exemplified but not limited to, stamping, mechanical cutting, laser cutting, injection, casting, sintering and other suitable related processes.

The package of plates (300) is formed by grouping and parallel alignment of a plurality of plates (310), wherein the holes (320, 330, 340) are aligned with each other and form a package of plates (300), the package of plates (300) being arranged in a suitable injection tool, provided with a cavity to receive the package of plates (300) and cavities to allow for formation from and in the channel formed by the alignment of the perimeter holes (330) of the injected fixing bars (400) having functional pins (420), tying the assembly together without the need for short-circuit rings, welds, screws and other fixing elements.

The injected fixing bars (400) having functional pins (420) according to the invention are full-length elements (C), formed in one piece, injected into the perimeter holes (330), comprising a bar (410) that completely fills the channel formed by the alignment of the perimeter holes (330) and two functional pins (420) that project beyond the faces of the plates (310) of the package of plates (300).

The material used for injection of the injected fixing bars (400) having functional pins (420) should be an injectable material, preferably, but not limited to aluminum and/or one or more of its alloys.

Said injected fixing bars (400) having functional pins (420) must be understood as multifunctional elements, which may present geometries and builds suitable for carrying out several functions and/or for functioning as fixing elements for additional accessories or parts.

Said functional pins (420) and bars (410) perform the primary function of tying one or more packages of plates (300), wherein the simple version of functional pins (420) may take up any shape suitable to retain the plates (310) from the packages of plates (300), being preferably cylindrical and having two fixing regions (421) with a fixing height (a) and a fixing diameter (D) being larger or the same as the body diameter (d) of bar (410), as shown in FIGS. 3, 3a, 3c and 3d. It is important to note that the bars (410), functional pins (420) and fixing regions (421) may have shapes other than cylindrical, such as, but not limited to: polygonal, oval, oblong, elliptical and other related shapes. In this case, diameters (D, d) are to be taken as the maximum external dimensions.

Figure 1:
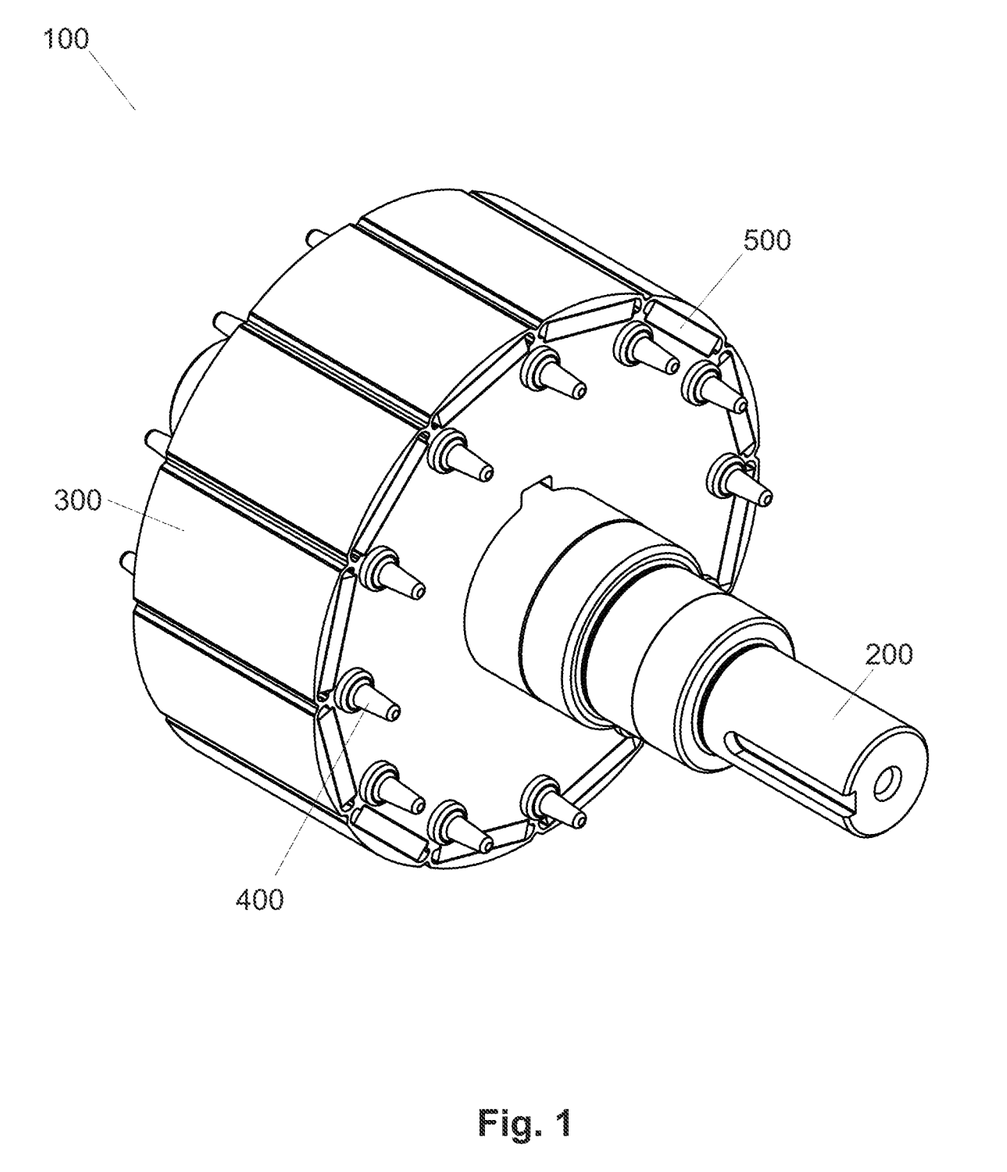
FIG. 1: shows a perspective view of a rotor according to the invention, with the shaft mounted thereon.
Figure 2:
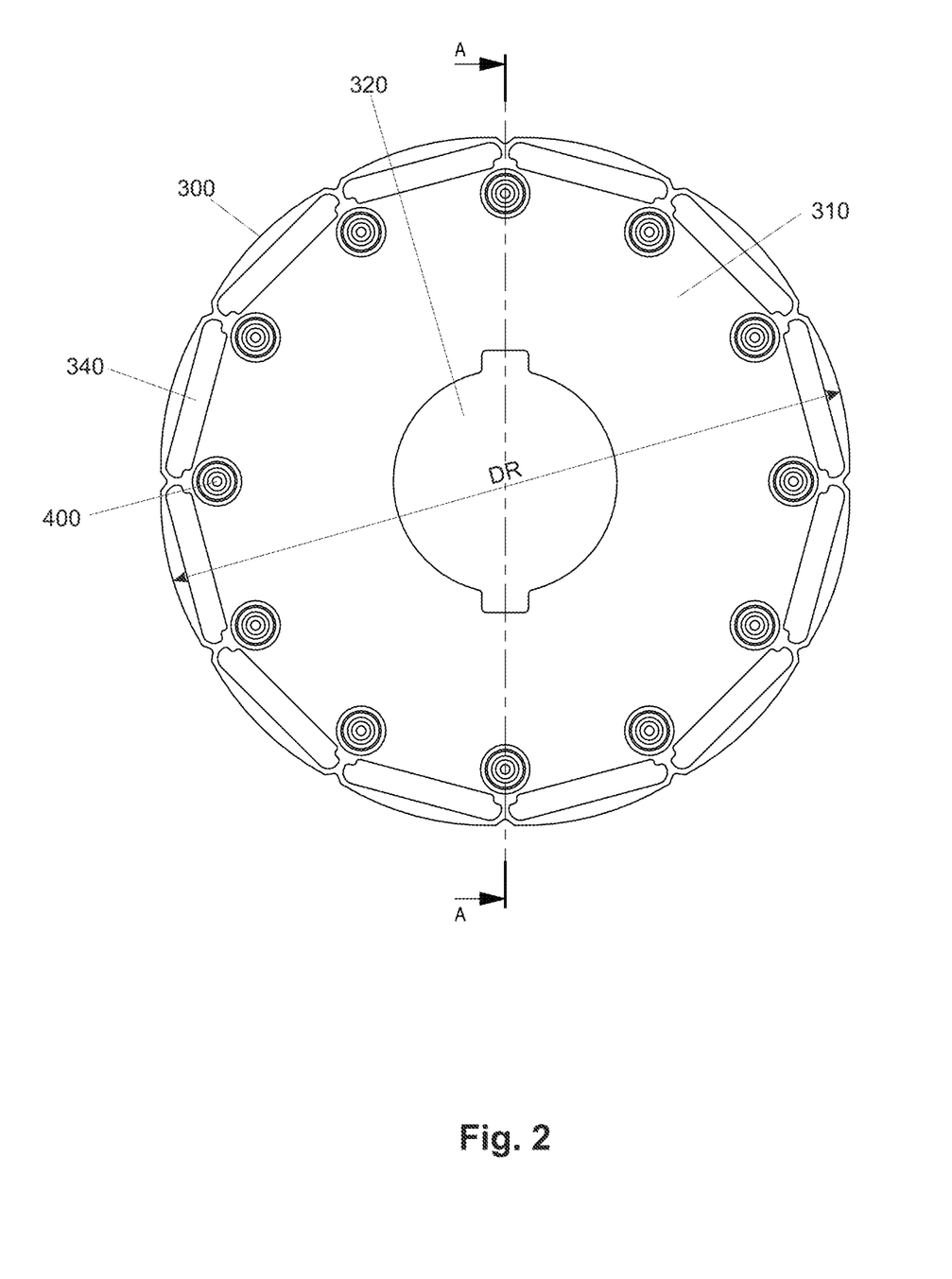
FIG. 2: shows a front view of the rotor of FIG. 1, without the shaft.
Figures 3, 3A:
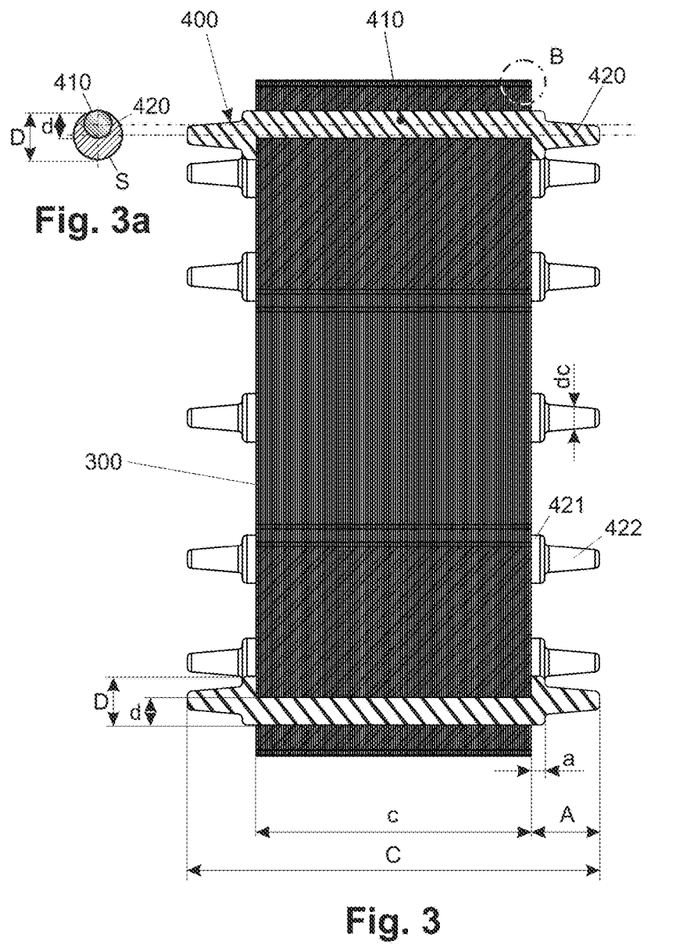
FIG. 3: shows a side view of an A-A section of FIG. 2.
FIG. 3a: shows a front view of a partial section of a fixing and balancing bar of FIG. 3.
Figure 3B:
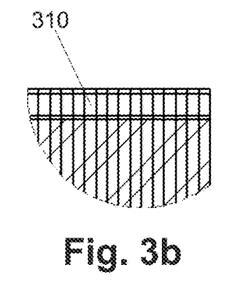
FIG. 3b: shows a side view of detail B of FIG. 3.
Figure 3C:
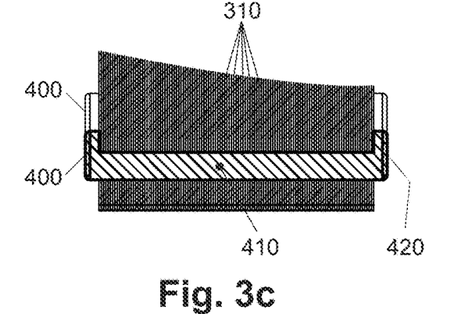
FIG. 3c: shows a partial side view of a fixing bar having a simple functional pin inserted into a package of plates.
Figure 3D:
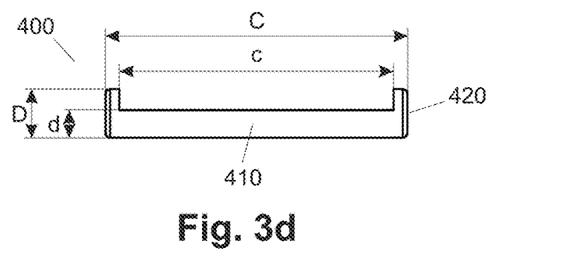
FIG. 3d: shows a side view of a fixing bar having a simple functional pin according to the invention.

In a non-limiting embodiment of the present invention, said functional pins (420) are used for balancing of the rotor (100), wherein each functional pin (420) has a height (A), comprising one or more fixing regions (421) with a fixing diameter (D) and fixing height (a), and one or more balancing regions (422), its diameter (dc) being smaller or the same as the fixing diameter (D) and decreasing as it moves away from the package of plates (300), as shown in FIGS. 3 and 3a. It is important to note that the balancing regions (422) may have several shapes, according to the project, such as, but not limited to: cylindrical, conical, truncated, polygonal, oval, oblong and other similar shapes.

The bar (410) has a length (c) equal to or slightly longer than the length (longitudinal measurement) of the package of plates (300) and a body diameter (d) that is equivalent to the diameter of the perimeter holes (330), since it completely fills them up. The body diameter (d) is smaller than or equal to the fixing diameter (D), preferably smaller, thus forming a contact surface (S), which is equal to the difference between the surface of the cross section in the region of the fixing diameter (D) and the surface of the cross section in the region of the body diameter (d), ranging from slightly larger to up to 10 times, preferably 2 to 5 times larger, most preferably 3 to 4 times larger than the total surface of the cross section in the region of body diameter (d). This construction allows for fixing and tying the package of plates (300) between the contact surfaces (S). Additionally, and as a side note, even if diameters (d, D) are equal, there being no contact surface (S) in this case, there will be at least minimal tying of the plates (310) as a consequence of the internal roughness generated by stacking of the plates (310) in the perimeter holes (330).

It should be noted that this dimensional relationship may vary according to the characteristics of the project, the expected number of injected fixing bars (400) having functional pins (420) and their body diameters (d) in order to resist the forces arising from the electric motor rotation regime and withstand the shear stresses in the border region between the bar (410) and the functional pin (420). A safe, but not limiting, ratio between the diameters (D, d) is established when the fixing diameter (D) does not exceed the body diameter (d) by more than 3.5 times, wherein the body diameter (d) must represent 2% to 30%, preferably 5% of the external diameter (DR) of the rotor (100).

It should also be noted that the bars (410) and the functional pins (420) do not need to be concentric, as there can be eccentricity between their longitudinal shafts, according to the project specifications, for example, to enable for arrangement of the perimeter holes (330) nearest to the external perimeter of the rotor (100) keeping the dimension of the contact surfaces (S) unchanged, thus reducing interference in the magnetic flux without compromising the fixing guaranteed by the contact surfaces (S).

The balancing region (422), in turn, allows for addition of mass to the rotor (100). A non-limiting example of addition of mass is the arrangement of washers or the like on the balancing region (422), with a washer or the like sliding on the balancing region (422) until it touches the surface of the fixing region (421). Once this is done, pressure is applied to the free part of the conical region so that the washer or the like is crushed and trapped.

It should be noted that, depending on the assembling conditions, this operation may not be necessary or may be necessary, with application of a single washer or the like in a single position or one or more washers or the like in a single position or in more than one position. The washers or the like can be of any suitable material.

The number of fixing bars (400) having functional pins (420) depends on the characteristics of the project, the dimensions of the rotor (100), the rotation of the electric motor to which it is intended to, and other related characteristics.

This formation of the rotor (100) package through injection of injected fixing bars (400) having functional pins (420), for concomitant fixing and tying of the one or more packages of plates (300) and balancing of the rotor (100), forms a rigid package capable of withstanding all the efforts foreseen for its application eliminating the processes of welding and external fixing elements, as well as eliminating the need for endpoint sheets and short-circuit rings for balancing of the rotor (100).

A single injected fixing bar (400) having functional pins (420) may perform different functions through different functional pins (420). A non-limiting example within the scope of the invention is the use, in one end of a bar (410), of a functional pin (420) having a simple fixing region (421) for tying, and in the other end of the bar (410), of a functional pin (420) having a fixing region (421) for tying and a balancing region (422) for balancing.

Figure 5:
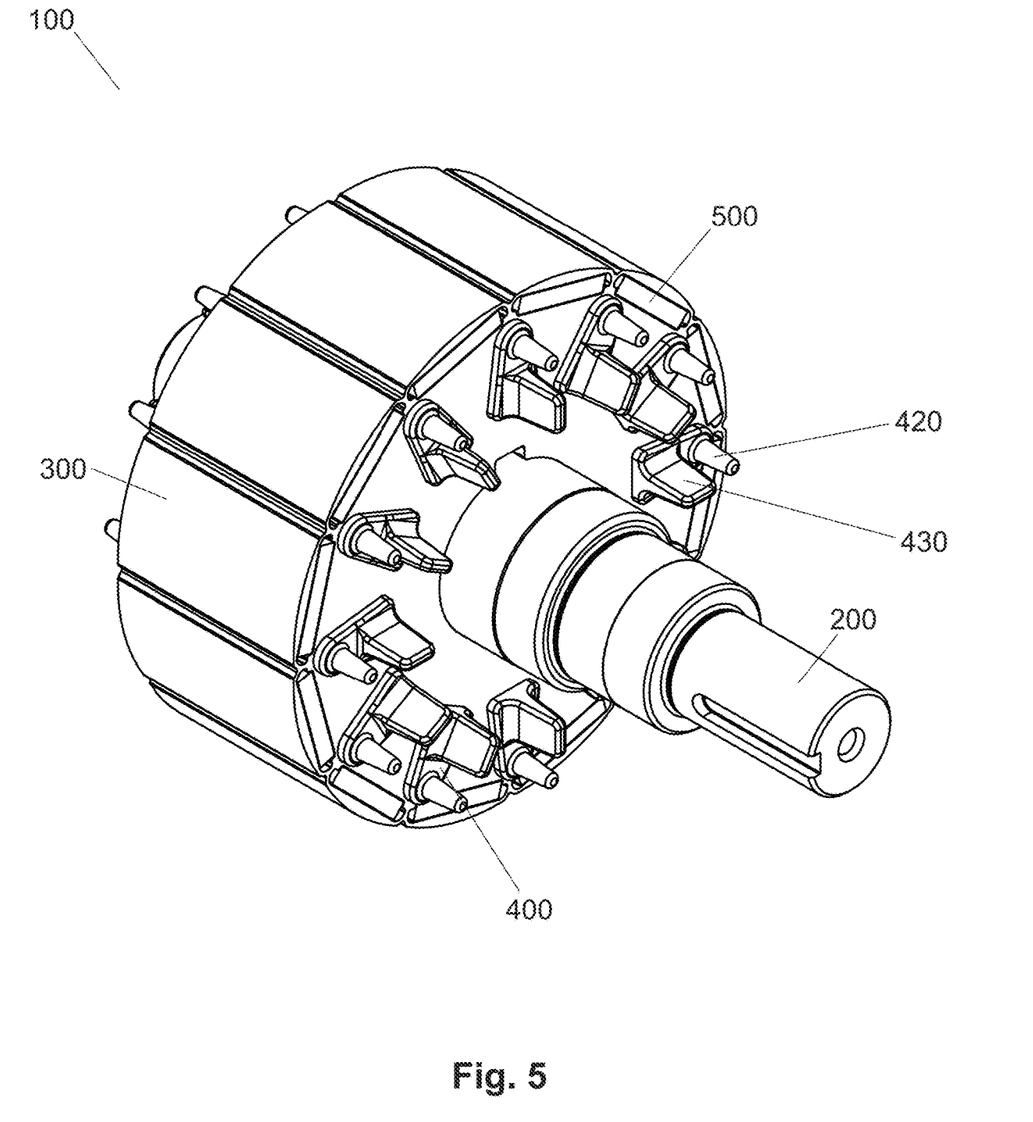
FIG. 5: shows a perspective view of a rotor according to the invention, with the shaft mounted thereon.
Figure 6:
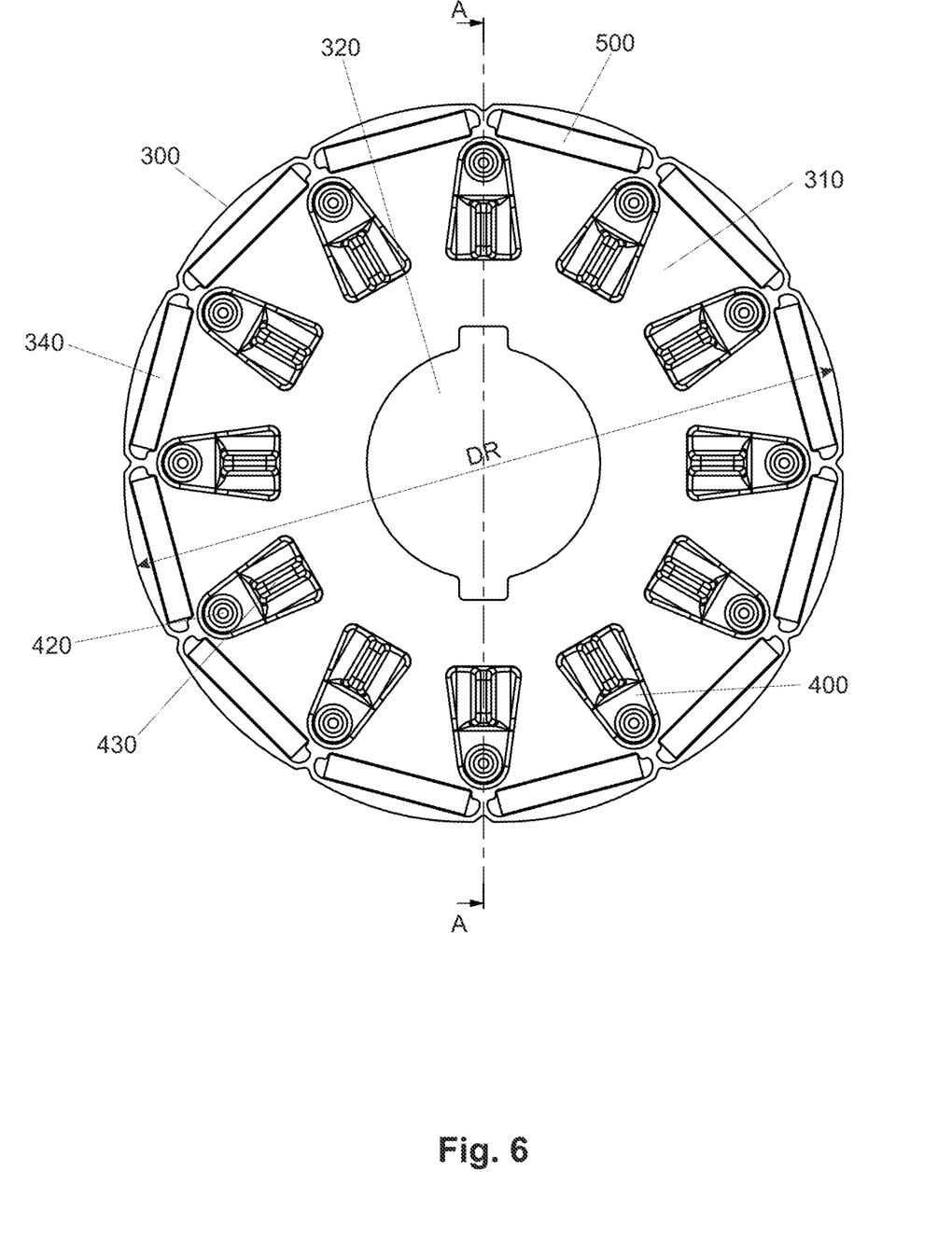
FIG. 6: shows a front view of the rotor of FIG. 5, without the shaft mounted thereon.
Figure 7:
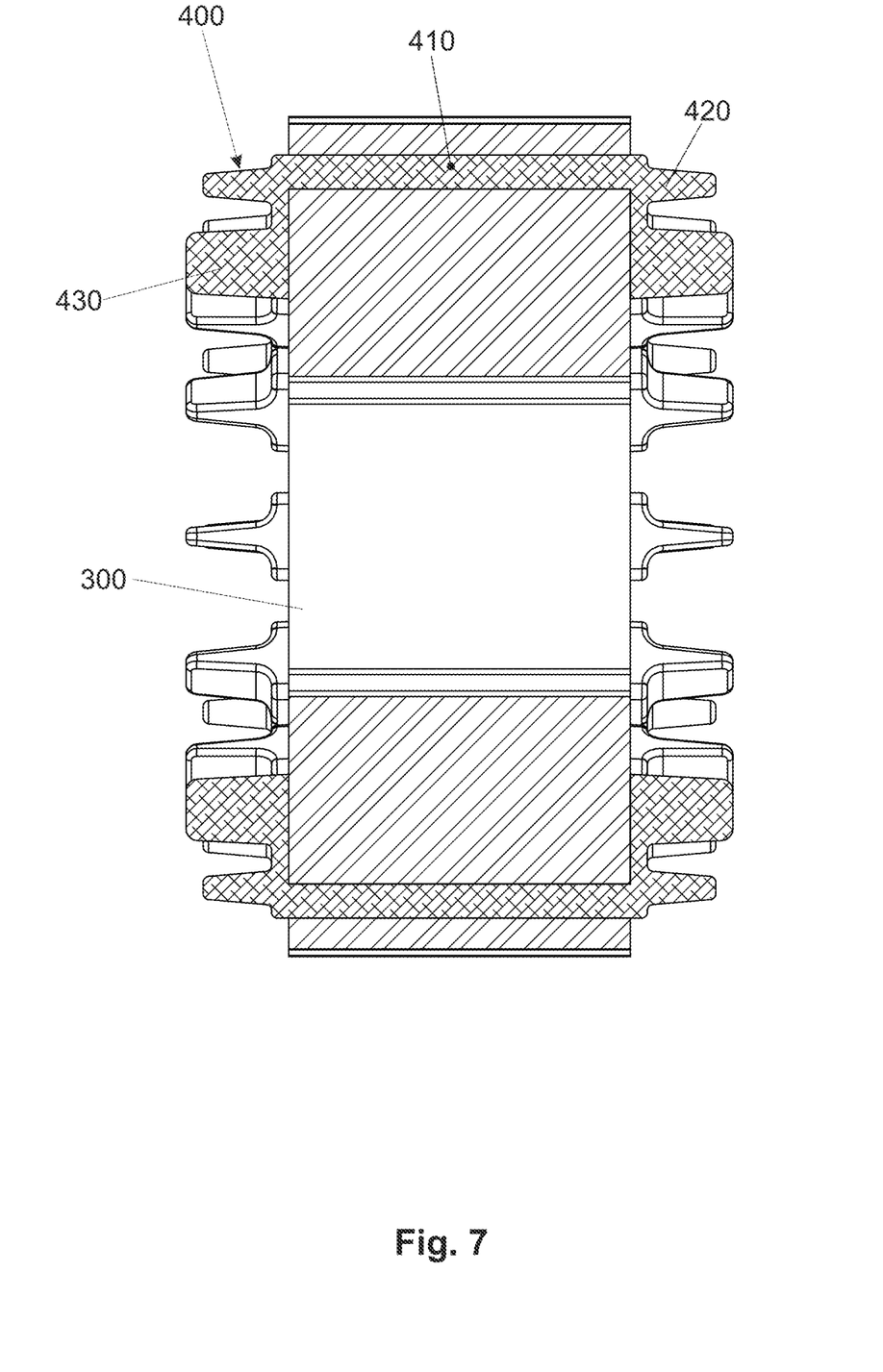
FIG. 7: shows a side view of an A-A section of FIG. 6.

In another non-limiting embodiment of the present invention, said functional pins (420) are used both for tying and balancing as well as internal venting and/or cooling of the motor, wherein cooling and/or venting fins, or just fins (430), having dimensions and shape suitable to the intended cooling and/or venting conditions, are added to the functional pins (420), as shown in FIGS. 5 to 7.

Here it is important to highlight the multifunctional condition of each end of the bar (410), meaning that a single bar (410) may have an end for tying and balancing, and another end for tying and cooling and/or venting.

In yet another non-limiting embodiment of the present invention, said functional pins (420) are of a simple geometry, having the sole purpose of fixing the cooling and venting fins, or just fins (430), wherein it is possible to perform tying to one and cooling and/or venting on another end of a single bar (410).

Figure 8:
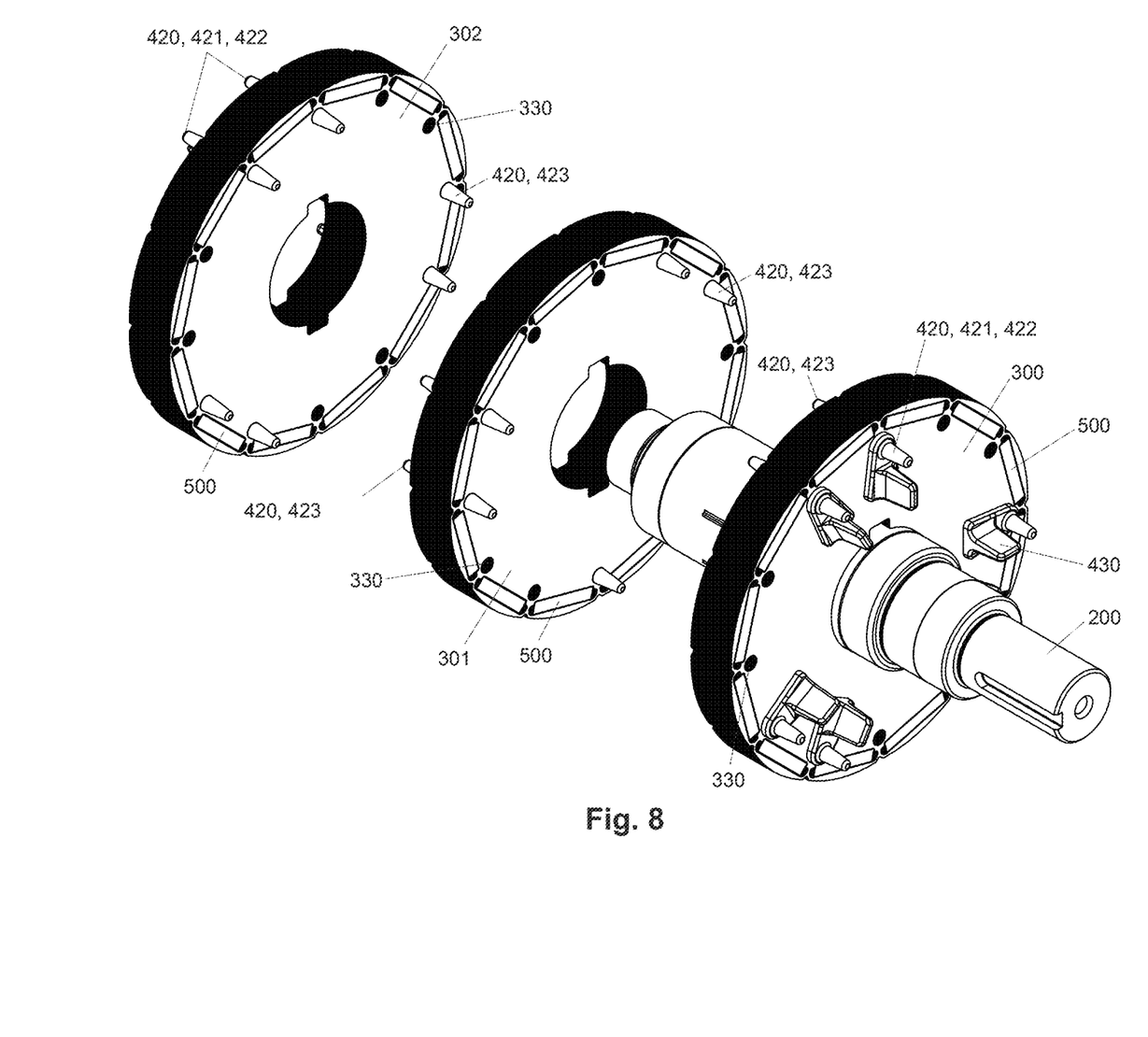
FIG. 8: shows an exploded perspective view of a rotor having more than one package of plates arranged on their shaft.
Figure 8A:
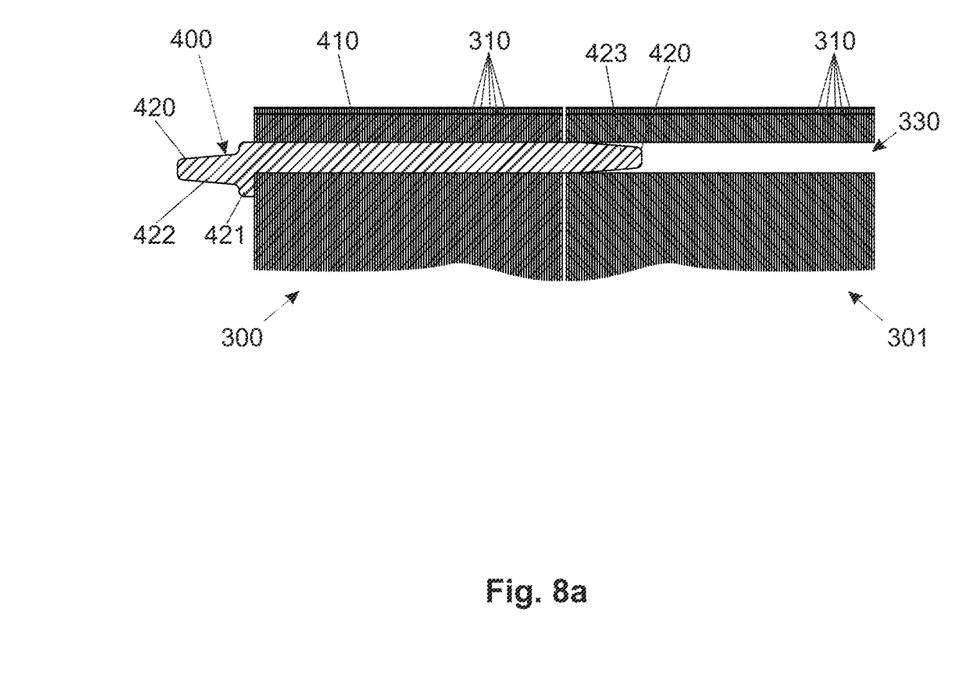
FIG. 8a: shows a partial side view of a fixing bar having a functional pin comprising a fixing region and a balancing region and another functional pin comprising a connecting region inserted into a package of plates.

In another non-limiting embodiment of the present invention, said functional pins (420), in addition to the fixing region (421), also present one or more connecting regions (423), which function as connecting elements for one or more packages of plates (300, 301, 302) arranged on the shaft (200), as shown in FIGS. 8 and 8a, in accordance to the description above wherein the rotor (100) is capable of supporting one or more equal or different packages of plates (300), according to the rotary electric machine application.

Here, we have the same multifunctional condition of each end of the bar (410), meaning that a single bar (410) may have an end for tying, while the other end is for connection of one or more packages of plates (300).

Figure 10:
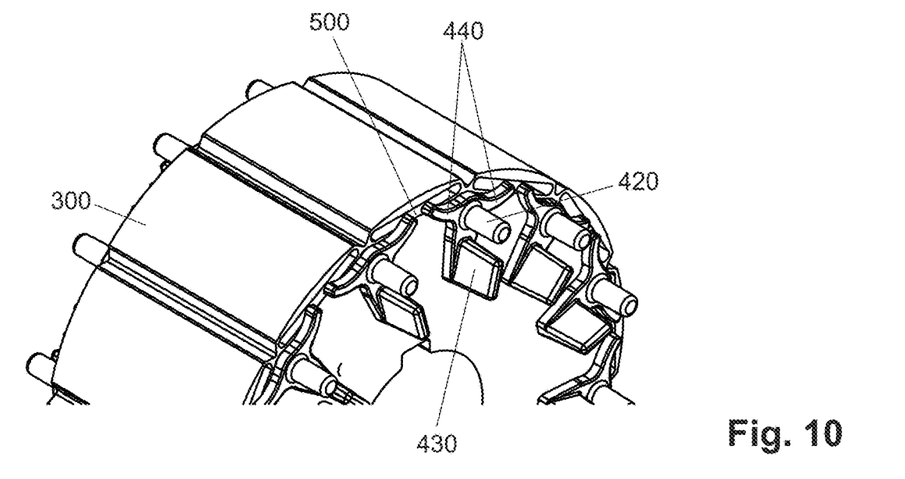
FIG. 10: presents a partial frontal view of the rotor of FIG. 9, with the rods already in their final state, mechanically deformed.
Figure 11:
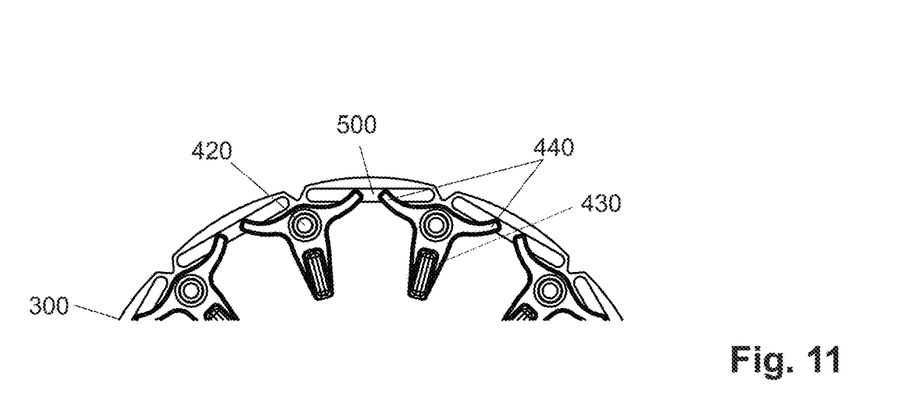
FIG. 11: shows a partial front view of the rotor of FIG. 10.

In yet another non-limiting embodiment of the present invention, the functional pins (420) are used for tying the one or more packages of plates (300, 301, 302) and concomitant cooling and/or venting by means of fins (430) as well as for the axial retention of the magnets (500), wherein one or more rods (440) are added to the functional pins (420), starting from, for example but not limited to, the fixing region (421) extending around it in the direction of the magnets (500). The rods (440) fix the magnets (500) inside the slot holes (340) avoiding their axial translation, as specially shown in FIGS. 10 and 11. This retention is external to the package of plates (300) and, thus, does not interfere in the electromagnetic performance of the rotor (100), in addition to eliminating the need for other methods of fixing the magnets (500), as well as costly assembly/processes for manufacturing, and acting as an additional safeguard for extreme cases, for example, overtemperature and the like.

Figure 9:
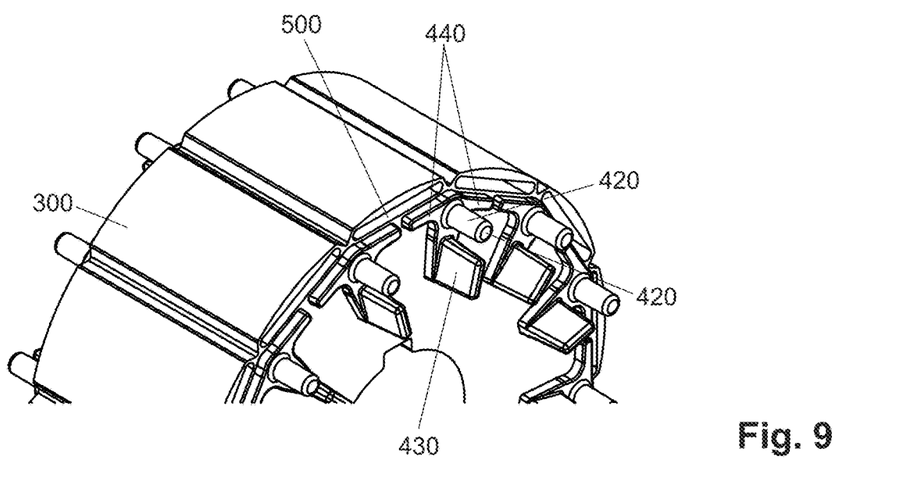
FIG. 9: shows a partial perspective view of a rotor according to the invention, provided with functional pins which perform fixing and tying of the plates in the package, cooling, balancing and axial retention of the magnets by means of rods, the rods being straight, prior to mechanical deformation.

The rods (440) can be manufactured as elements that project around from, but not limited to, the fixing region (421), as shown especially in FIG. 9, and after the insertion of the magnets (500) in the slot holes (340), they can be mechanically deformed until overlapped with the slot holes (340) in which the magnets (500) are located. For this embodiment, the condition of multifunctionality of each end of the bar (410) is also valid.

In yet another non-limiting embodiment of the present invention, said functional pins (420) are of a simple geometry, having the purpose of fixing accessories or additional parts such as, for example, sensors, position markers, and other suitable elements, wherein different ends may perform different functions, as described above.

Thus, said functional pins (420) may perform one or more of the above-described functions, be it alone or together, wherein both ends may perform the same function, or different functions.

Said multifunctionality of said functional pins (420), in addition to allowing for one or more functions to be performed in a single injected fixing bar (400) having functional pins (420), also allows for the possibility of alternating, around or along the perimeter of the rotor (100), between injected fixing bars (400) having functional pins (420) performing different functions. A non-limiting example is alternating between injected fixing bars (400) having functional pins (420) for tying and balancing, and injected fixing bars (400) having functional pins (420) for cooling and/or venting and so forth. It is also possible to employ one or more injected fixing bars (400) having functional pins (420) for the same or different functions, being adjacent or not and/or grouped together or not. Another non-limiting example is the possibility of alternating injected fixing bars (400) having functional pins (420) for tying and axial fixing of the magnets (500) with injected fixing bars (400) having functional pins (420) for cooling and/or venting and so on. There can even be one or more injected fixing bars (400) having functional pins (420) with the same or different functions, being adjacent or not and/or grouped together or not.

Said multifunctionality of said additional functional pins (420) also allows for different functions to be performed in one or more packages of plates (300, 301, 302). The non-limiting example of FIG. 8 shows the first package of plates (300) having functional pins (420) comprising fins (430) for cooling/venting, a fixing region (421) and a balancing region (422) in one end and a fixing region (421) and a connecting region (423) in the other end, the packages of plates (300) are grouped in groups of two and alternated with pairs of perimeter holes (330) which are non-filled, so that the connecting regions (423) of the functional pins (420) of the a second package of plates (301) may connect, and so forth.

Therefore, functional pins (420) may be and perform the same or different functions at a single end, be and perform the same or different functions at different ends, and be and perform the same or different functions in one or more package of plates (300, 301, 302), be it alone or together.

A process for manufacturing a rotor (100) according to the invention is a process for manufacturing a rotor (100) comprising a shaft (200), one or more packages of plates (300), injected fixing bars (400) having functional pins (420) and permanent magnets or just magnets (500).

This process comprises the steps of:
i. Stamping of the plates (310) with a central hole (320), perimeter holes (330) and slot holes (340);
ii. Grouping and parallel alignment of a plurality of plates (310) with the holes (320, 330, 340) aligned with each other, forming a package of plates (300);
iii. Arrangement of the package of plates (300) in a suitable injection tool provided with a cavity to receive the package of plates (300) and cavities to allow for the formation of the injected fixing bars (400) having functional pins (420);
iv. Injection of injectable material for formation of the injected fixing bars (400) having functional pins (420), including filling of the perimeter holes (330);
v. Pressing of the shaft (200) into one or more packages of plates (300) by inserting the shaft (200) through the central hole (320);
vi. Insertion of the magnets (500) into the slot holes (340);

When said functional pins (420) are used for balancing of the rotor (100), the process for manufacturing according to the invention may also comprise an additional process step, as follows:
vii. Balancing of the rotor (100) with the possible addition of mass by arranging one or more washers or the like on the balancing region (422) and crushing the free part of the balancing region (422) to trap the washer or the like.

When said functional pins (420) are used for axial fixing of the magnets (500), the process for manufacturing according to the invention may also comprise an additional process step, as follows:
viii. Promoting mechanical deformation of said rods (440) until overlapped with the slot holes (340) wherein the magnets (500) are located.

It should be noted that, in a case where the functional pins (420) are used both for balancing the rotor (100) and axial fixing of the magnets (500), the process will comprise two corresponding additional steps, as described above.

The process for manufacturing according to the invention has important and impacting differences in relation to the equivalent steps of the processes for manufacturing rotors in the state of the art.

The time needed for carrying out steps ii, iii and iv of the invention is reduced by up to 90% compared to the times for equivalent steps in the state of the art, since there is no need to press or weld the package of plates (300). That said, the process of the invention does not include the steps of pressing and welding from the state of the art.

The presence of the injected fixing bars (400) having functional pins (420), in addition to eliminating the need for an additional short-circuit ring, also eliminates the use of balancing discs, external elements for cooling and/or venting, as well as fixing elements in the package of sheets. That said, the process of the invention does not include the steps of assembling and pressing short-circuit rings and/or balancing discs or the like, nor the step of inserting fixing elements onto the package of plates or heat sinks.

The time needed for carrying out step vii of the invention is reduced by approximately 70% compared to the times for equivalent steps in the state of the art, since one only needs insert one or more washers or the like on the balancing region (422) and crush it until the washer or the like is retained and stabilized.

In this way, the process according to the invention for manufacturing a rotor (100) according to the invention drastically reduces the manufacturing times for rotors of the nature treated herein, decreases material and labor costs, increases productivity, requires fewer steps and optimizes manufacturing capacity by eliminating the use of welding machinery, robots, etc. It should be noted that the process according to the invention may have other accompanying steps, before and after those described above, according to the technical knowledge and manufacturing practices necessary for the construction of rotors for rotary electric machines.

A rotary electric machine according to the invention is an electric motor having a rotor (100) according to the invention manufactured according to a process according to the invention.

CONCLUSION

It will be easily understood by those skilled in the art that modifications can be made to the present invention without departing from the concepts set out in the description above.

These modifications must be regarded as included in the scope of the present invention. Consequently, the particular embodiments previously described in detail are illustrative and exemplary only, and are non-restrictive as to the scope of the present invention, to which the full extent of the appended set of claims and any and all correspondents thereof should be given.

What is claimed is:

1. A rotor for a rotary electric machine, comprising:
a package comprising a plurality of plates, and
a plurality of injected fixing bars having functional pins,
wherein each said injected fixing bar having functional pins comprises one bar and two functional pins on opposite ends of the one bar;
wherein said one bar and said two functional pins are formed in a single piece;
wherein said one bar comprises two ends;
wherein each of said two functional pins comprises a fixing region for fixing and tying said package of plates of the rotor and at least one of the two functional pins includes a balancing region adjacent the fixing region for adding mass to balance the rotor, the balancing region and the fixing region being a single piece, the fixing region being axially between the balancing region and the one bar; and
wherein the rotor excludes a short-circuit ring on either side of the package, and said functional pins on either side of the package of respective said injected fixing bars are separate from each other.

2. The rotor according to claim 1, wherein both said two functional pins perform one or more additional functions at both ends of said one bar in said injected fixing bar having functional pins, said one or more additional functions chosen from a group consisting of cooling and connecting, both said two functional pins performing the same one or more additional functions.

3. The rotor according to claim 1, wherein the balancing region tapers away from the fixing region.

4. The rotor according to claim 3, wherein at least one of the two functional pins further comprises one or more fins and/or one or more rods, the one or more fins and/or one or more rods being a single piece with the fixing region of the at least one of the two functional pins.

5. The rotor according to claim 1, wherein at least one of the two functional pins further comprises a connecting region for connecting said package of plates.

6. The rotor according to claim 5, wherein said at least one of the two functional pins further comprises one or more fins and/or one or more rods, the one or more fins and/or one or more rods being a single piece with the fixing region of the at least one of the two functional pins.

7. The rotor according to claim 1, wherein the fixing region of each of said two functional pins has a fixing diameter and each said one bar has a body diameter, wherein said body diameter is smaller than or equal to said fixing diameter.

8. The rotor according to claim 1, wherein each of said two functional pins project out of said package of plates.

9. The rotor according to claim 1, wherein each plate in said plurality of plates comprises a plurality of perimeter holes.

10. The rotor according to claim 9, wherein a plurality of channels is formed by aligning said plurality of perimeter holes of each of the plates in the package, in which each of said channels of the plurality of channels is filled by one of said one bars of said injected fixing bars having functional pins.

11. The rotor according to claim 1, wherein each of said two functional pins performs an additional function chosen from a group consisting of cooling and connecting, each of said two functional pins performing a different additional function.

12. A rotary electric machine comprising the rotor according to claim 1.

13. A rotor for a rotary electric machine, comprising:
a plurality of packages, each package comprising a plurality of plates, and a plurality of injected fixing bars having functional pins,
wherein each said injected fixing bar having functional pins comprises one bar and two functional pins on opposite ends of the one bar;
wherein said one bar and said two functional pins are formed in a single piece;
wherein said one bar comprises two ends;
wherein each of said two functional pins comprises a fixing region for fixing and tying said package of plates of the rotor, and at least one of the two functional pins includes a balancing region adjacent the fixing region for adding mass to balance the rotor, the balancing region and the fixing region being a single piece, the fixing region being axially between the balancing region and the one bar; and
wherein the plurality of packages are configured to couple to each other via the plurality of injected fixing bars having functional pins of each package in the plurality of packages, each package having the functional pins and a plurality of perimeter through-holes, wherein respective adjacent packages are connected together by respective functional pins inserted into corresponding respective perimeter through-holes.

14. The rotor according to claim 13, wherein both said two functional pins perform one or more additional functions at both ends of said one bar in said injected fixing bar having functional pins, said one or more additional functions chosen from a group consisting of cooling and connecting, both said two functional pins performing the same one or more additional functions.

15. The rotor according to claim 13, wherein the balancing region tapers away from the fixing region.

16. The rotor according to claim 15, wherein at least one of the two functional pins further comprises one or more fins and/or one or more rods, the one or more fins and/or one or more rods being a single piece with the fixing region of the at least one of the two functional pins.

17. The rotor according to claim 13, wherein at least one of the two functional pins further comprises a connecting region for connecting said package of plates.

18. The rotor according to claim 17, wherein said at least one of the two functional pins further comprises one or more fins and/or one or more rods, the one or more fins and/or one or more rods being a single piece with the fixing region of the at least one of the two functional pins.

19. The rotor according to claim 13, wherein the fixing region of each of said two functional pins has a fixing diameter and each said one bar has a body diameter, wherein said body diameter is smaller than or equal to said fixing diameter.

20. The rotor according to claim 13, wherein each of said two functional pins project out of each of said plurality of packages of plates.

* * * * *